March 11, 1969     P. L. POWELL     3,432,096
PINION ASSEMBLY

Filed July 3, 1967     Sheet 1 of 2

INVENTOR
Patrick L. Powell

By Norton Lesser
Attorney

March 11, 1969 P. L. POWELL 3,432,096
PINION ASSEMBLY
Filed July 3, 1967 Sheet 2 of 2

INVENTOR
Patrick L. Powell

By Norton Lesser
Attorney

United States Patent Office 3,432,096
Patented Mar. 11, 1969

3,432,096
PINION ASSEMBLY
Patrick L. Powell, Franklin Park, Ill., assignor to Stewart-Warner Corporation, Chicago, Ill., a corporation of Virginia
Filed July 3, 1967, Ser. No. 650,672
U.S. Cl. 235—96        10 Claims
Int. Cl. G06c 27/00

ABSTRACT OF THE DISCLOSURE

The following specification discloses an odometer in which the pinions for transferring rotational movement between the odometer dials are of moulded plastic and rotatably supported by a respective plastic bracket. One or more lips are provided on the bracket for snap fitting engagement with a circumferential flange on the pinion to hold the pinion against axial movement.

---

This invention relates in general to an improved motion transfer apparatus for a counter and more particularly to a one piece bracket and to a pinion for use therewith in transferring movement from one dial of an odometer to another odometer dial.

Odometer pinions are used to incrementally advance or rotate a higher digit order dial for each complete revolution of the adjacent lower digit order dial. The pinions are usually of metal such as brass and since the pinions are located radially within the periphery of the dials each is journalled in a separate bracket located between each pair of dials. Each bracket therefore positions the respective pinion for cooperation with gear teeth on the lower and higher digit order dials to transfer rotation therebetween.

In order to hold the pinions on the respective brackets during assembly operations, each bracket is formed of two metal portions welded together with the pinion sandwiched therebetween and journalled in each bracket portion.

The just described bracket arrangement gives rise to a number of problems due to the difficulty in properly aligning the two bracket portions and pinion and the difficulty in providing good welds consistently. In addition the use of metal bracket portions necessitates the use of a metal pinion instead of a plastic pinion, which can be simply moulded.

The present invention is designed to eliminate the aforementioned problems by providing an integrally formed moulded bracket and a moulded pinion which are snap fitted together for enabling rotatable movement of the pinion while holding the pinion against axial movement to facilitate assembly of the bracket and pinion in the odometer. Basically, the improvement is accomplished by a circumferential flange on the pinion snap fitted behind one or more lips formed on the bracket with the pinion rotatably supported on a pin integrally formed on the bracket so that the pinion rotates freely, but is held against axial movement.

Accordingly, it is one object of the present invention to provide an improved and more economical pinion and bracket assembly for a counter.

It is another object of the present invention to provide a one piece bracket for rotatably supporting a counter pinion with limited axial movement.

It is still another object of the present invention to provide an economical counter pinion having means limiting axial movement thereof.

Other objects and features of the present invention will become apparent on examination of the following specification and claims together with the drawings wherein:

Figure 1:
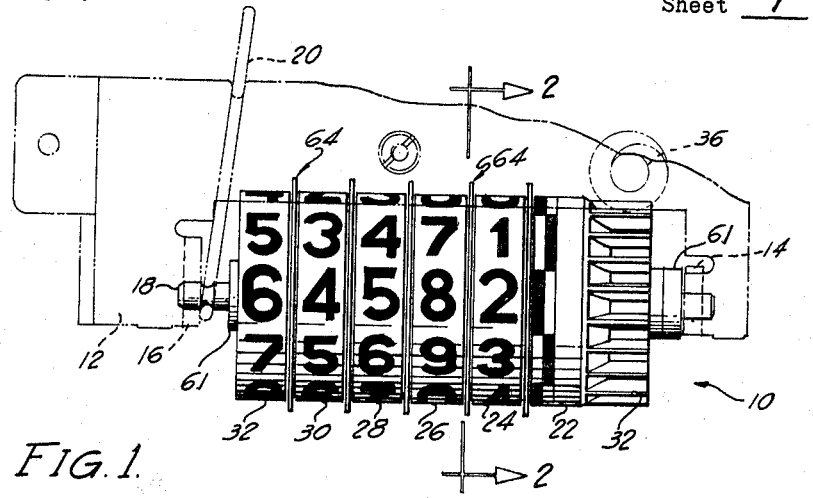
FIG. 1 is a front elevational view of an odometer assembly incorporating the principles of the present invention.

In FIG. 1 of the drawings an odometer assembly is indicated generally by the reference character 10. The assembly is supported on a bracket 12 indicated by broken lines and having a pair of spaced arms 14 and 16 in which an odometer shaft 18 is received. The arm 16 is usually only slotted to receive the shaft 18 so that a spring latch 20, which depends from the bracket 12, is provided to hold the shaft 18 properly engaged in the slot of the arm 16.

The shaft 18 rotatably supports a drive wheel 22 and a plurality of odometer dials 24, 26, 28, 30 and 32 with the dials each assigned a successive digit order and arranged with the lowest digit order dial adjacent the drive wheel 22. The drive wheel 22 has external gear teeth 34 so that it may be driven from a source of external power usually a thrust gear 36 rotated by power transmitted through a flexible shaft.

Figure 2:
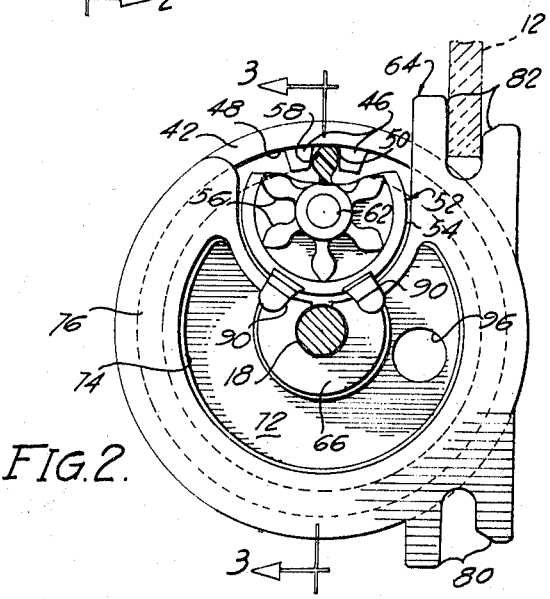
FIG. 2 is a sectional view taken along the line 2—2 in FIG. 1 between a pair of odometer dials for illustrating the relationship between the pinion, bracket and associated lower digit order odometer dial.
Figure 3:
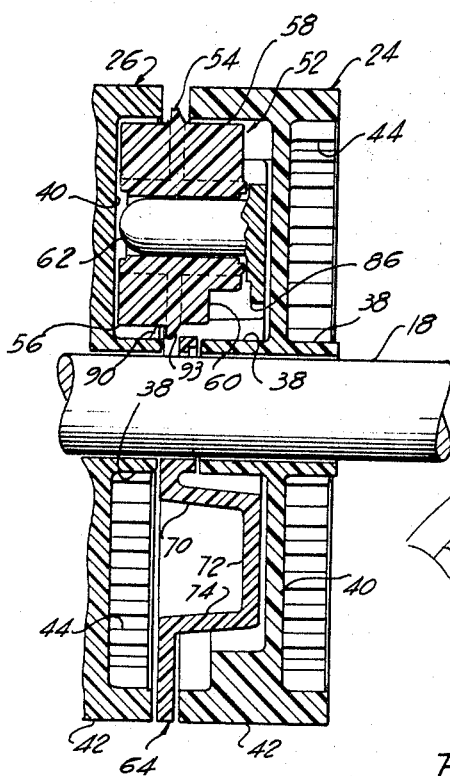
FIG. 3 is a sectional view of a portion of the odometer assembly taken along the line 3—3 in FIG. 2.
Figure 5:
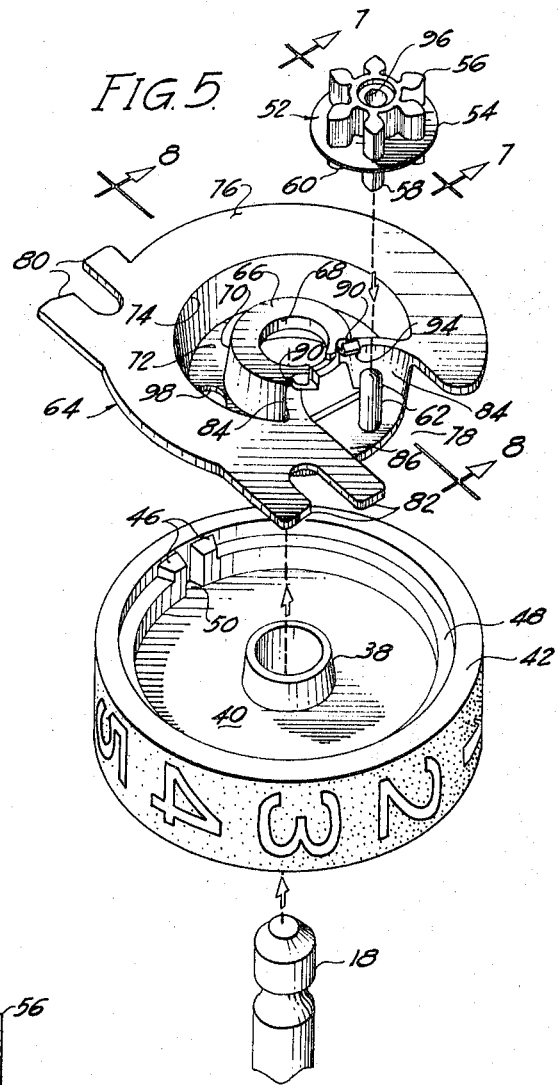
FIG. 5 is an exploded isometric view of a bracket, pinion and associated lower digit order dial to illustrate their relationship.

The dials each include a hub portion 38 as seen in FIG. 3, having a circumferential rib 40 extending radially outwardly intermediate the ends of the hub 38. An annular rim 42 overlapping the hub is formed on the periphery of the rim and twenty internal teeth 44 are formed on the inner surface of the rim for receiving movement transmitted from the adjacent lower digit order dial. Two internal teeth 46 as best seen in FIGS. 2 and 5, are formed on the inner surface of the rim on the opposite side of rib 44 for transmitting movement to the adjacent higher digit order dial. The teeth 46 extend axially from a second rim portion 48 formed on the adjacent internal surface of rim 42 and an opening 50 between the two teeth 46 extends into the second rim portion 48. The drive wheel 22 is likewise provided with two internal teeth for transmitting movement to the adjacent digit order dial 24.

Figure 4:
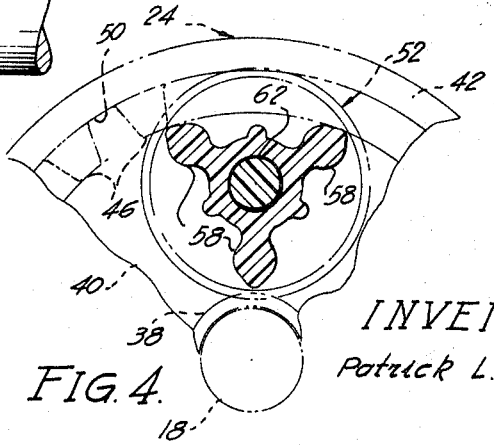
FIG. 4 is a schematic view taken just beyond the short teeth of the pinion and looking in the direction of the second rim portion on a lower digit order dial to illustrate the coaction of the adjacent long gear teeth with the second rim portion of the lower digit order dial.
Figure 9:
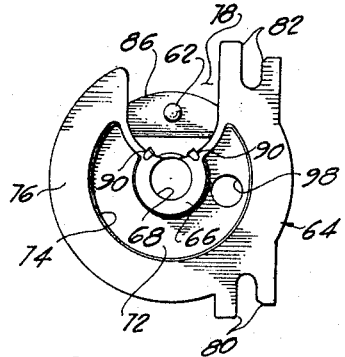
FIG. 9 is a front elevational view of the pinion supporting bracket.
Figure 6:
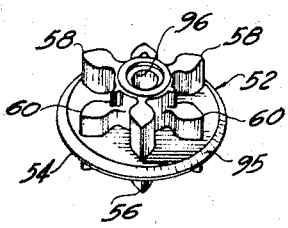
FIG. 6 is an isometric view of the opposite side of the pinion from that shown in FIG. 5.

Movement is transmitted from the drive wheel and between each pair of dials by means of a respective plastic mately 52 having a circumferential flange 54 of approximately .285" diameter axially spaced intermediate the pinion ends. The diameter of the flange 54 is therefore less than the radius of the dials. Six conventional teeth 56 are formed on one side of the circumferential flange for engagement between the twenty teeth of the adjacent higher digit order dial. Three axially lengthened teeth 58 are formed on the opposite side of the flange for engagement between the two teeth 46 and in opening 50 of the adjacent lower digit order dial. Alternating with the three teeth 58 are three axially short teeth 60. Short teeth 60 ride the radial face of rim portion 48 while teeth 58 ride the inner periphery of rim portion 48 as indicated in FIG. 4. Whenever the lower digit order dial is completing one revolution a tooth 60 engages with a side of one of teeth 46 extending from rim portion 48 to rotate the pinion. One of teeth 58 therefore is rotated to engage in opening 50 and enable the pinion to be further rotated as the lower digit order wheel completes its revolution. Opening 50 is then disengaged from the tooth 58 and the pinion remains stationary while the lower digit order dial continues to rotate. This effects incremental rotation of the pinion to in turn effect incremental rotation of the higher digit order wheel through the pinion teeth 56 and dial teeth 44.

Each pinion 52 is rotatably carried by a cantilevered pin 62 integrally formed on a one piece or integral plastic bracket 64 located between a respective pair of dials and between the lowest digit order dial and the adjacent drive wheel. The dials and brackets and drive wheel are held against more than a desired amount of axial movement on shaft 18 by a pair of press fit collars 61 provided adjacent opposite ends of the shaft 18. The collars 61 are usually press fit to a position permitting axial movement of only between .003″ and .007″ of the dials so as to avoid binding of the dials.

Figures 7, 8:
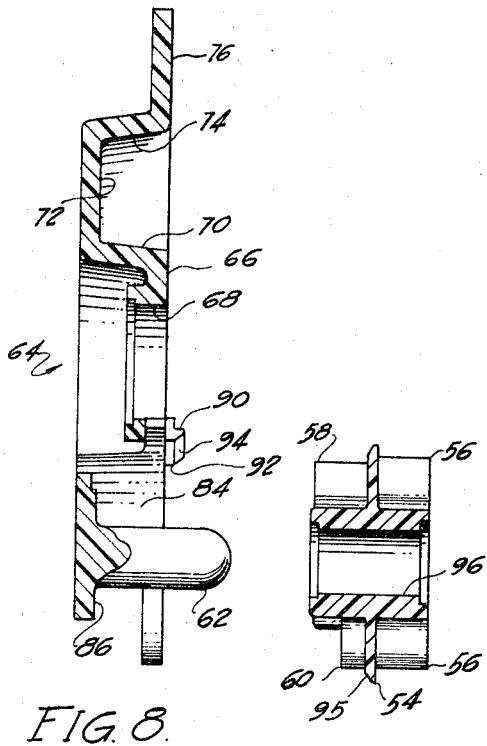
FIG. 7 is a sectional view of the pinion taken along the line 7—7 in FIG. 5.
FIG. 8 is a sectional view of the bracket taken along the line 8—8 in FIG. 5.

Each bracket 64 comprises a central hub or radial wall 66 through which shaft 18 passes. The wall 66 has an outer radius of approximately .125″ and is buttressed adjacent its inner radius by a short annular wall 68 as best seen in FIGS. 5 and 8, having an inner diameter of approximately .125″ for supporting the bracket on shaft 18. The pin 62 is located approximately .216″ from the axis of wall 66. An axial extending conical wall 70 is provided adjacent the periphery of radial wall 66 and it intersects a second radial wall 72 having an outer radius of approxiamtely .275″. Wall 70 tapers radially outwardly from wall 68 at less than 5°. An axially extending annular rim 74 is initiated at the outer edge of radial wall 72 with rim 74 tapering at about 5° in a direction opposite wall 70. Rim 74 in turn terminates in a generally peripheral flange 76 having a cutaway portion 78 extending into flange 76 and walls 66, 70 and 74. Radially outwardly directed pairs of spaced ears 80 and 82 are provided on flange 76 and the space between each pair of ears 80 and 82 serves to receive a respective edge portion of brackets such as 12 to prevent rotational movement of the bracket 64 on shaft 18.

Defining the cutaway portion 78 are a pair of spaced axially extending curved walls 84 joining walls 66, 70, 72 and 74 and flange 76. Walls 84 are curved about a radius of approximately .150″ from a common center lying on the axis of pin 62, which projects from a wall portion 86. Wall portion 86 is a continuation of wall 72 lying between walls 84 and is provided with a straight side to define its inner edge. Wall 70 is cut away adjacent this inner edge between the walls 84, while the radial wall 66 is cut away at a position opposite pin 62 as is an adjacent portion of annular wall 68.

A pair of lips 90 projecting toward the axis of pin 82 are formed on the upper edge portion of walls 84 adjacent the respective intersection of each wall 84 with walls 66 and 70. Each lip has a portion 92 overhanging the cutaway portion 78 for about .015″ with each lip being about .022″ wide and lying about 30° from a line joining the axis of pin 62 with the axis of wall 66. The lips are approximately .02″ thick but are relieved for .01″ in the portion directly above walls 84 so that they may flex. A cam or bevelled surface 94 is provided on the overchanging portion 92 of each lip to facilitate flexure of the lip in response to axial movement of the pinion flange 54 on assembly of the pinion 52 with pin 62. A cam or bevelled surface 95 on the flange 54 also facilitates flexure of the flange for moving past the lips.

The pinion 52 is provided with an axial bore 96 for engagement with pin 62, which extends axially beyond the wall 66 and flange 76. To assemble the pinion 52 with the bracket 64 the pin 62 is simply engaged in bore 96 and the bracket and pinion moved axially relative one another until the flange 54 engages the cams or bevelled surfaces 94. At that time additional axial pressure and/or flexure of wall portion 86 permits the flange 54 to move past the lips 90, whereafter axial disengagement from the bracket 64 is prevented during normal handling procedures by the lips and the wall 86.

The brackets 64 with the respective pinions 52 are assembled on shaft 18 together with the dials, drive wheel and collars in a conventional manner or, if desired, with automatic equipment since the assembled pinion and brackets present an easily handled subassembly. The annular wall 66 encircles the shaft 18 and nestles between the hubs 38 of the adjacent dials. The pin projecting from the wall 86 toward the higher digit order dial permits the pinion to be assembled with the flange 54 located between the rims and hubs of the adjacent dials and passing through the space provided in wall 66 opposite pin 62. Location of the lips in this arrangement on opposite sides of the space in wall 66 and in a plane common to the portion of the hub of the higher digit order dial avoids interference with the hubs of the dials and still permits the pinion teeth to properly mesh with the dial teeth.

An aperture 98 in each wall 72 of bracket 64 may be used for angularly locating the brackets 64 relative the dials 24–32. With the odometer assembled it may be mounted on a conventional bracket 12 using either pair of ears 80 or 82 and, if desired, both pairs of ears may be used for engagement over oppositely disposed bracket edges.

The foregoing constitutes a description of an improved bracket and pinion for use in a counter with the inventive concepts thereof believed set forth in the following claims.

What is claimed is:

1. A combination for use in a counter having a plurality of dials rotatably supported on a common shaft and each assigned a successive digit order with each dial having gear teeth for transferring movement therefrom to a pinion located between each pair of dials with the periphery of said pinion being encircled by the periphery of said dials for transferring movement from said pinion to gear teeth on an adjacent higher digit order dial to incrementally move said higher digit order dial in response to a different incremental movement of the adjacent lower digit order dial, the improvement comprising a bracket between each pair of dials having integrally formed means thereon for engaging a respective pinion to rotatably support said pinion, and means integrally formed on each bracket effective in response to the engagement of said pinion with said integrally formed support means at a predetermined axial position for thereafter resisting axial movement of said pinion from said position.

2. A bracket for use in rotatably carrying a pinion to transfer movement from one counter dial to a higher digit order dial, the improvement comprising a bracket, means integrally formed on said bracket for rotatably supporting said pinion with said pinion being axially movable relative said supporting means to one position, and means integrally formed on said bracket and engaged by said pinion on axial movement of said pinion in one axial direction to a predetermined axial position for thereafter limiting axial movement of said pinion in the opposite axial direction.

3. For use with a bracket having lip means thereon located between a pair of counter dials each representing a different digit order, the improvement comprising a plastic pinion for transferring rotational movement between said dials, and a circumferential flange on said pinion having a diameter less than the radius of each dial and adapted to be moved axially relative said lip means to a predetermined position for thereafter engaging said lip means to limit axial movement of said pinion in the opposite axial direction.

4. A combination for use in a counter having a plurality of dials rotatably supported on a common shaft and each assigned a successive digit order with each dial having gear teeth for transferring movement therefrom and gear teeth for being moved incrementally in response to a different incremental movement of the adjacent lower digit order dial, the improvement comprising a bracket for use between each pair of dials and supported on said shaft, a pinion for each bracket, integrally formed means on each bracket for rotatably supporting a respective pinion to cooperate with respective teeth on the adjacent lower and higher digit order dials for transferring movement between said lower and higher digit order dials, a circumferential flange integrally formed on each pinion, and lip means integrally formed on each bracket extending past the periphery of said flange when said pinion is rotatably supported on said integrally formed means for resisting axial movement of said flange and said pinion in one axial direction.

5. The combination claimed in claim 4 in which said lip means comprises a pair of lips each projecting toward the axis of rotation of said pinion.

6. The combination claimed in claim 5, in which each of said lips lie on opposite sides of a line joining the axis of said pinion with the axis of said shaft and lie in a plane common to a portion of one of the adjacent dials.

7. The combination claimed in claim 4, in which said integrally formed support means comprises a radial wall on said bracket spaced adjacent the lower digit order dial, and a pin cantilever supported by said radial wall having an axis lying within the periphery of said dials and projecting toward the higher digit order dial.

8. A combination for use in an odometer having a shaft rotatably carrying a plurality of successive dials each assigned a respective digit order with each dial having a hub encircling said shaft and a circumferential rim wall spaced from said hub and interconnected with said hub by a radial wall located intermediate gear teeth for receiving motion and gear teeth for transmitting motion formed on the internal surface of said rim wall adjacent respective sides of said radial wall, the improvement comprising a bracket between each lower and higher digit order dial, an integrally formed radial support wall on said bracket spaced adjacent the radial wall of the adjacent lower digit order dial, a pin integrally formed on said support wall and projecting axially in the direction of the higher digit order dial, a pinion having gear teeth rotatably carried by said pin for intermittently engaging the gear teeth of said lower digit order dial for receiving motion therefrom and engaging the gear teeth of the adjacent higher digit order dial for transferring motion thereto, a peripheral flange on said pinion intermediate the ends of said pinion and projecting beyond the ends of said pinion gear teeth, and integrally formed lip means on said bracket within the axially projected periphery defined by said flange and spaced axially from said support wall with said flange located between said support wall and lip means whereby said lip means limits the axial movement of said pinion from said support wall.

9. The combination claimed in claim 8, in which said lip means comprises a pair of lips spaced radially from said shaft and projecting in the direction of said pin with each of said lips lying in a plane common to a portion of the hub of the adjacent higher digit order dial.

10. The combination claimed in claim 9 in which said lips are spaced on respective sides of a line joining the axis of said pin with the axis of said shaft.

References Cited
UNITED STATES PATENTS

| | | | |
|---|---|---|---|
| 1,577,069 | 3/1926 | Olsen | 235—96 |
| 1,692,489 | 11/1928 | Dinsmore | 235—139 |
| 2,117,024 | 5/1938 | Helgeby et al. | 235—96 |
| 2,547,751 | 4/1951 | Harada | 235—144 |
| 2,656,107 | 10/1953 | Vogler | 235—96 |
| 3,137,444 | 6/1964 | Harada | 235—117 |

RICHARD B. WILKINSON, *Primary Examiner.*

S. A. WAL, *Assistant Examiner.*

U.S. Cl. X.R.

235—139